Nov. 2, 1965  R. M. STEPHENS  3,215,366
ROTORCRAFT
Filed May 16, 1963  5 Sheets-Sheet 1
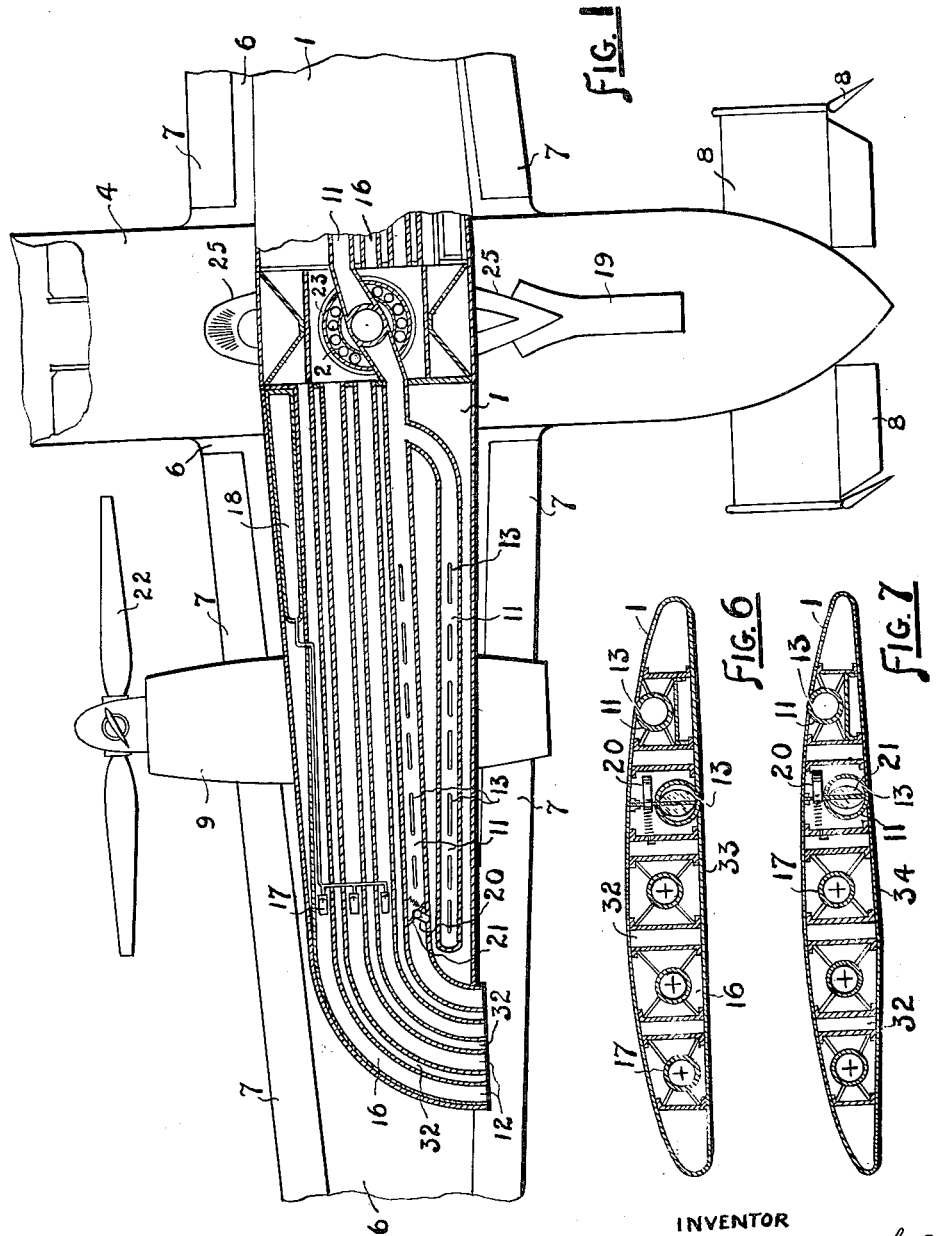
INVENTOR
Robt M Stephens

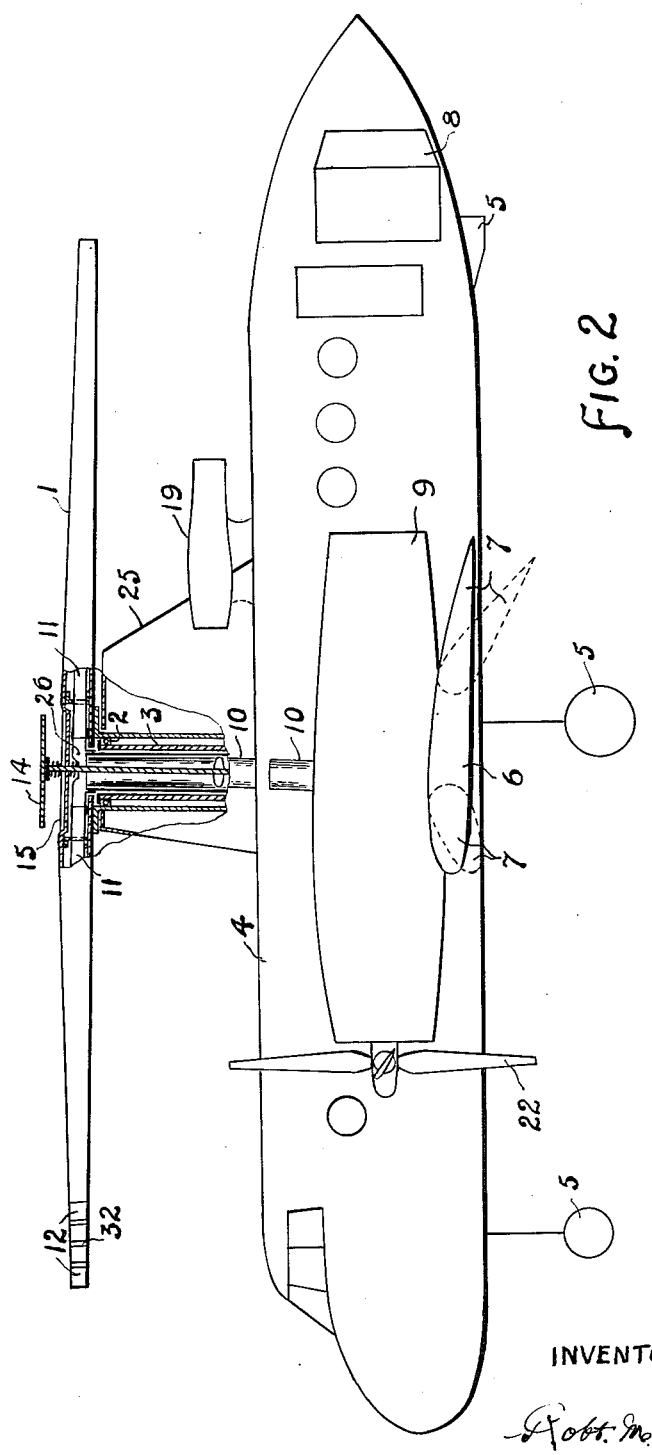

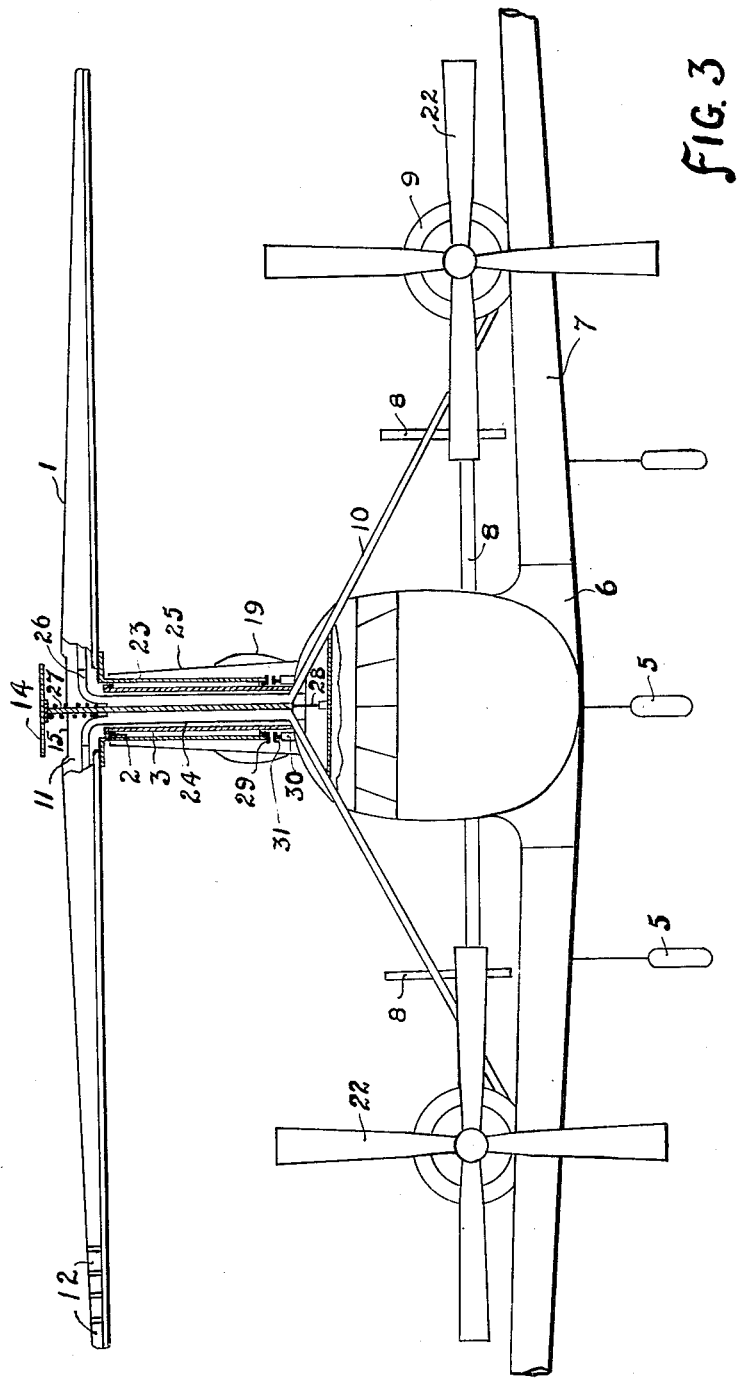

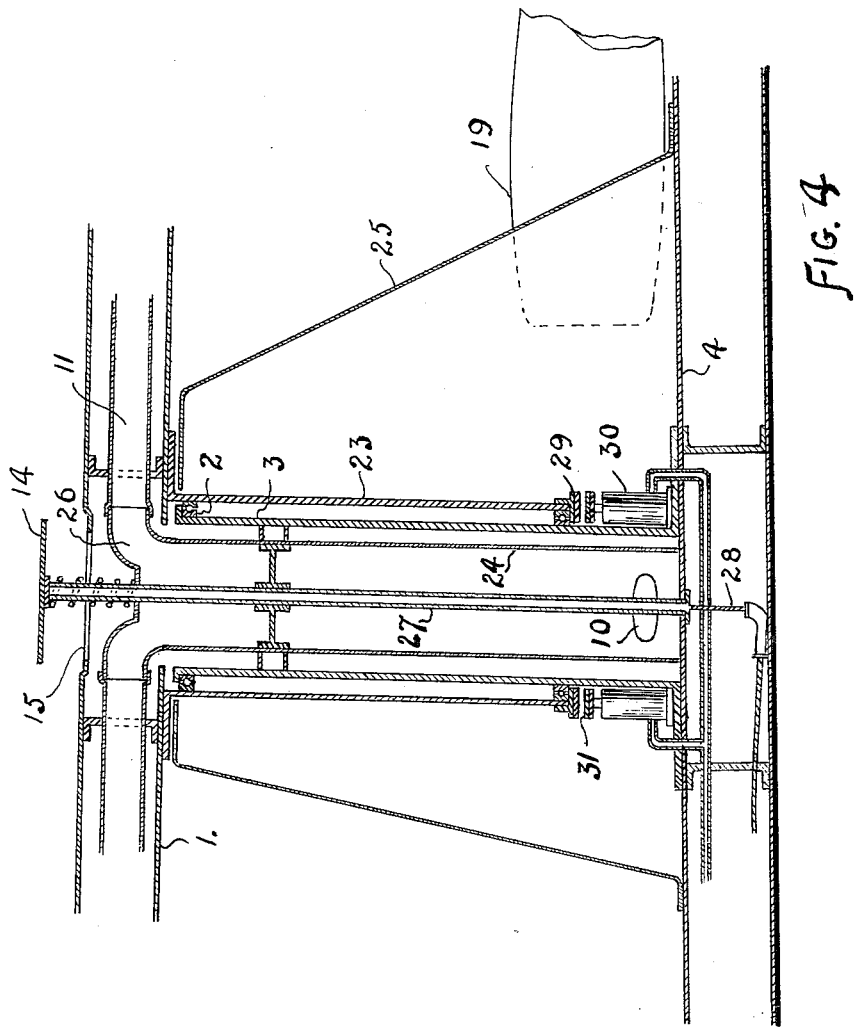

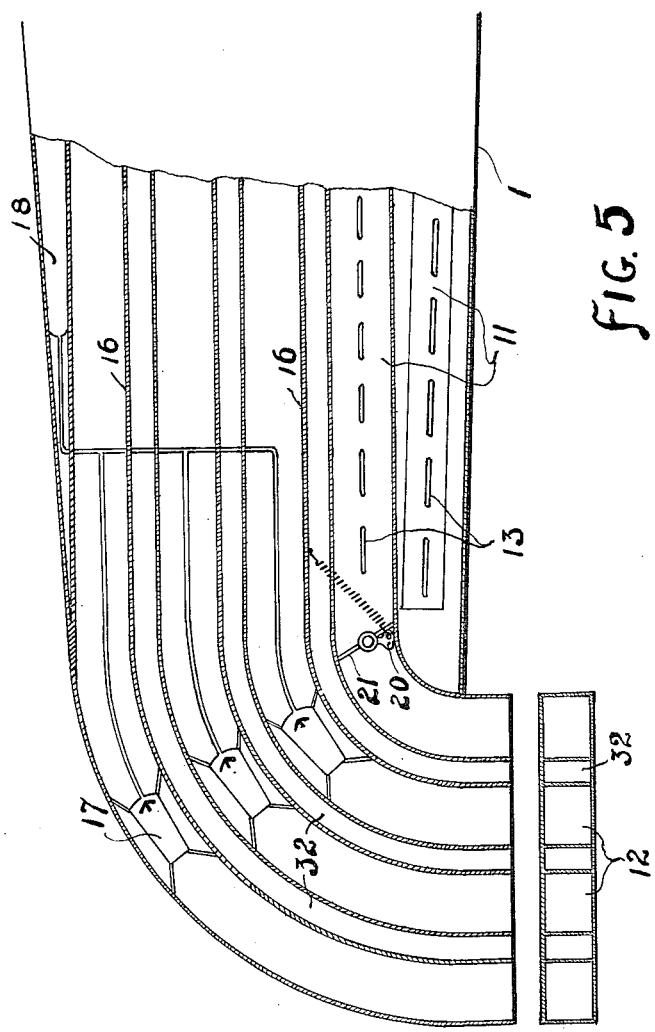

3,215,366
ROTORCRAFT
Robert Melling Stephens, 296 Matheson Ave., Winnipeg, Manitoba, Canada
Filed May 16, 1963, Ser. No. 280,804
11 Claims. (Cl. 244—7)

At the present time the only aircraft capable of operating city-center to city-center in the short haul range, e.g., 200 to 300 miles, is the helicopter. Its relatively low speed of 175 miles per hour coupled with a high passenger-mile operating cost are its chief drawbacks. In 1957 the Fairy "Rotordyne" which operated somewhat along helicopter lines underwent a series of tests. It was designed to remedy particularly the high passenger-mile operating cost of the helicopter, which it did very successfully but brought in its wake its own problems, chiefly noise, hot oil splattering and excessive vibration. These difficulties were never fully overcome and it was finally abandoned in 1962.

Conventional high speed fixed wing airliners require for take-off a mile-long runway, which is not available in city-center; and if vertical-take-off-and-landing (VTOL) characteristics could be given to this type of aircraft, such improvement would be without parallel in the history of aviation.

It is in this short-haul 250-mile range that the type of aircraft like the Vickers "Viscount" propelled by turbo-prop engines finds its niche, and while its speed is no match for the turbo-jet it has a cruising speed 2½ times that of the helicopter including the Fairy "Rotordyne." Its lower wing loading compared with turbo-jet would be of great assistance if VTOL characteristics could be applied.

Present invention seeks to retain all the advantages of this turbo-prop aircraft and couple with it VTOL characteristics. In appearance however the type of craft invented resembles the Fairy "Rotordyne" which incidentally is different from the helicopter only in that the Rotordyne has in addition a fixed wing of short span in the high wing position carrying half the total load, while the other half is carried by the rotor. On the other hand a helicopter rotor carries all the load all the time.

In the present invention the fixed wing is dimensioned to carry approximately 90 percent of the load and its rotor the 10 percent balance. The percentages relate of course to translational (forward) flight at cruising speed, while in vertical-take-off as in landing the rotors would sustain all the load. The difference between the rotor of the Rotordyne and the present invention is one of function as well as design, and as a contingent consequence the aircraft requires a change in configuration from the high wing position of the Rotordyne to the low wing position, for reasons to be explained later.

The Rotordyne acquired its excellent VTOL characteristics by means of a fuel-fired jet at the tip of its enormous 90-foot diameter four-bladed rotor. These are the tip jets responsible for the hot oil splattering; and being located right at the wing tip, some of the fuel escapes unburnt. They were also responsible in operation for most of the noise. These jets were supplied with highly compressed air ducted from a pair of turbo-prop engines located outboard under the fixed wings of the aircraft astride the fuselage.

In cruising flight the Rotordyne being driven solely by the turbo-propellers its rotor is then in the unloaded condition, that is, without benefit of power and consequently autorotates, but still contributes 50 percent of the lift. Autorotation occurs because of a natural imbalance of drag between the advancing and retreating blades in translational flight. The retreating blade having its back to the wind, so to speak, has the greater drag. With the four-bladed rotor of the second embodiment of present invention this condition still exists but to a much smaller degree, by design generating just enough centrifugal force in the unloaded condition to counteract blade flutter. However, with the two-bladed rotor of the first embodiment having a wider chord and greater depth there is greater rigidity in the blades and the necessity to autorotate when in the unloaded condition is absent. In translational flight the rotor would be halted and secured in the transverse position lying directly above the fixed wings and so becomes a secondary airfoil. The distinguishing design feature of the blades is that the upper surface is highly cambered and symmetrical and thus generates lift consequent upon air flow from either direction whether rotating or locked. This is a unique feature basic to the invention and is believed to represent a new concept in rotor design. With a conventional airfoil profile, for instance, and with the blades locked in the transverse position, one blade would provide lift while the opposite blade would record a negative lift force.

It should be noted that the blades in all embodiments herein described have their chord line in line with the plane of rotation, consequently have in themselves no angle of attack, yet create lift. This lift is further increased and uniformly so on all blades operating in translational flight by giving a fixed angular elevation to the plane of rotation at the pylon to the same degree possessed by the lower fixed wing, possibly 3 degrees. At this angle the lift on this type of blade is considerably enhanced and the high drag on the blades somewhat compensated, with the rate of autorotation being regulated by the design of the lower camber. In the embodiment having the four-bladed rotor the lower blade contour will resemble the lower surface of the standard wing profile N.A.C.A. 23012 while the two-bladed rotor, likewise a three-bladed rotor, if used, would have its lower surface flat except at the nose and trailing edge which would be rounded off. The lower surface of the N.A.C.A. 23012 is unsymmetrical and the drag on it would be slightly greater when its back was to the wind, consequently would autorotate slightly when unloaded.

With the Fairy "Rotordyne" means were incorporated to obtain collective adjustable pitch whereby all four blades could be given a uniform angle of attack which in the VTOL regime provided equal lift on all four blades. At this angle the blades of the 90-foot diameter rotor have a co-efficient-of-lift maximum of 1.4 and at maximum revolutions provided a rate of climb of 1600 feet per minute.

With the present invention no such manipulation is necessary, the blades deriving their great lift by an entirely different principle to be explained later. From 5 to 7 times more lift per square foot of blade area can be generated depending on the mass of compressed air made available for ejection at the trailing edge. Obviously under proposed regime a much smaller diameter rotor is needed for the same lift, with all the accruing advantages.

The two blades of the rotor of this invention as depicted in the first embodiment are divided chordwise into a front portion and a rear portion. The rear portion receives this compressed cold air ducted via the pylon from the turboprop compressor located on the wings and because of the high pressure involved must be contained within ducts having a cylindrical form, from which it is ejected through a series of narrow slits at intervals running the length of the blade adjacent to the trailing edge, as well as from a jet at the tip of the blade.

The front portion of the blade forms a series of longitudinal ducts along which flows the large mass of ambient air entering at the top of the camber at the hub to be centrifuged by the rotation of the blades then, heated and exhausted at the tip to provide propulsion. The combustion chambers are placed at a distance of 3 feet approximately from the tip of the blade to ensure that the fuel is fully burnt.

Initially the compressed air will be directed to one of the tip jets to start the blades rotating and when the revolutions of the rotor have increased to the point where ambient air would be sufficiently centrifuged to support combustion, centrifugal force opens up the fuel supply to the fuel burners and at the same time a flap-valve under the action of a weight functionally centrifugally closes off the supply of cold compressed air to the tip, when it is then constrained to exhaust from the spanwise slits at the trailing edge to create lift. As the centrifugal force increases with the increased rotation of the rotor so does the fuel supply, and the power potential of the centrifuged ambient air becomes self-propagating limited by the amount of fuel it is found expedient to burn. Much addition power is thus made available to rotate the blades.

To a certain extent the design and location of the spanwise slits will follow the pattern laid out in illustrations 2.13a and 2.13b on page 23 of "Flight Handbook," 6th edition, published in 1961 by Aero Publishers Inc., Los Angeles. Illustration 2.13a shows a single jet sheet directed vertically downward from the lower camber near the trailing edge of the wing where, functioning in the manner of a Fowler flap, it produces this high lift as the wing moves forward. This jet sheet has the disadvantage however by reason of its deflection to the rear of producing additional thrust which if applied to the wing of a conventional airplane would be an undesirable factor. It is a primary necessity to reduce speed for landing, not increase it.

The concept of the jet flap had its beginning many years ago in the solution of boundary layer problems where alternatively suction or pressure of air at the upper surface of the wing was employed to prevent separation of the streamlines and so delay the stall condition brought about by the use of a too high angle of attack, approximately 20 degrees. This principle was later applied experimentally to the Fowler and similar flaps which in practice are set at a very high angle to slow the landing speed while increasing the lift. Good results were obtained increasing the Fowler flap $C_L$ max. 3.2 by some 50 percent. Later experiments by the National Gas Turbine Establishment in Britain as reported in "Flight" periodical of Sept. 30, 1955, envisaged the use similar to illustration 2.13a noted above, of blown compressed air as a jet flap at the trailing edge of an unflapped fixed wing, the air issuing horizontally for cruising flight and alternately directed vertically downward for low landing speed. The experiments were said to reveal that while a tremendous amount of compressed air was required, a $C_L$ max. of 10 and 12 could be obtained thereby (very likely by fuel-fired means). However it was revealed in 1961 as per illustration 2.13b previously mentioned that the National Gas Turbine Establishment had modified its previous recommendations and that the single slit should now be a triune affair and relocated, the net effect of which would be to compel the slipstream over the upper surface to curve down and under the wing trailing edge to meet the oncoming slipstream below, reversing the natural flow at the trailing edge. With this modification and the use of cold air instead of hot exhaust a $C_L$ max. 7.5 could be anticipated. The type of slit illustrated in 2.13b of course was devised to produce the required lift without the undesirable forward thrust previously mentioned when associated with the fixed wing but this would be no detriment to a rotating blade, consequently the arrangement illustrated in 2.13a or a compromise with 2.13b would lend itself to better advantage provided the jet on the underside were moved forward sufficient to bring the center of pressure (lift) midway of the chord. If this is not done the blade will twist and the lift will be greatly lessened. It will also be necessary to vary the angle of the jet sheet in accordance with the variation in velocities as they exist from the root to the tip of the blade as it rotates. When in full VTOL operation the tip of the rotor blade may be moving at a speed of 800 feet per second yet only 133 feet per second at the 5-foot radius mark, consequently the horizontal deflection of a jet sheet having a fixed efflux angle and a uniform velocity will vary greatly at these two points because the impact of the wind on the jet sheet as it moves in its circular course will vary as the square of the velocity. While these facts are valid in themselves it is also well known that 85 percent of the thrust of a propeller is performed by the outer half of the blade, which would indicate that to economize on air flow the spanwise slits should be confined to the outer 60 percent of the blades.

Without indicating the relative velocities, smoke tests in the wind tunnel reveal that as one consequence of this high lift phenomenon, demanding at great cost in power, sonic velocity in the air jet sheet, the whole mass of atmospheric air flowing over the upper and lower surface of the blade is diverted almost vertically downward whereas with the $C_L$ max. 1.4 of the Rotordyne blade the air mass is only deflected some 10 degrees. This vertical deflection of the air mass in considerable depth is the reason previously intimated I consider it essential to locate the fixed wing of this rotorcraft in the low wing position so as to reduce interference of the low wing with the jet sheet as much as possible. The difference in the two wing positions could amount to 8 feet or more.

In spite of the extremely high lift generated, VTOL benefits cannot be conferred by this means on the fixed wing of a conventional aircraft since a high velocity circulatory flow over and under the wing is necessary and this can only be obtained by a forward movement of the aircraft at 60 knots or more. The present invention overcomes this latter objection in that the rotor blades in rotating develop this great lift while the rotor craft remains in situ until the necessary amount of VTOL lift is generated. It is recognized of course that very large amounts of power are required to accomplish this end result, and this could be provided economically if all or even the major portion of the energy of the power units used for the propulsion of the aircraft could alternatively be diverted to the lifting effort. Unfortunately as in the case of the Rotordyne only about 30 percent of the turboprop energy can be transferred to the compressor to produce lift. Since the extra energy needed for the VTOL operation is only required for a minute or two while the rotorcraft is gaining height, the present invention hopes to repair this deficiency by creating a supplementary source of power by centrifuging ambient air within the blades and taking over the task of propelling the rotor, leaving to the compressor the sole task of providing the necessary compressed air for expulsion from the spanwise slits to create the lifting effort required.

In order to provide for the problem of transition from vertical to translational (forward) flight I provide an auxiliary jet engine of the by-pass type mounted upon the fuselage in line with the base of the pylon. It should have sufficient power to fly the aircraft alone at a speed of about 70 knots which would be well above the stalling point. I prefer the turbo-meca type having a compressor unit in the forward position where it could feed additional air if needed to the pylon and alternatively provide enough forward thrust to underwrite the turbo-prop engines when the compressor is shut down for transition to forward flight.

At the commencement of the VTOL operation of this rotorcraft the vent on the top camber of the rotor is opened for the admission of air. The propellers of the turbo-prop engines are then put into zero pitch and the engines started. The compressor is activated and compressed air is bled via the hollow braces to the pylon, thence to the ducted rear portion of the rotor blades to start the blades rotating, and later diverted to the spanwise slits to create lift.

By the time the rotorcraft is airborne and climbing, and cruising height attained, transition to forward flight will require the starting of the auxiliary engine, mainly as a fail-safe measure, and at the same time putting the propeller blades of the turbo-prop into fine pitch, and when the rotorcraft has exceeded the stalling speed, closing off the vent on top of the rotor and declutching the compressor. The air being cut off, the blades will cease to rotate and can be locked in the transverse position over the fixed wings. The auxiliary engine may or may not be shut down depending on circumstances. In landing, the sequence of these operations will be reversed.

Inherent in the scheme of this invention is the recognition within the formula for centrifugal force of the advantage obtained under the revolutions square law on and its application to the jet tip propulsion of this invention enabling the rotor diameter to be considerably reduced and increasing its strength relatively.

Tip jet propulsion increases its efficiency with increased speed. However above 80 percent of sonic velocity say 900 ft. per second at the periphery would appear to be the upper limit for civil operation.

With this upper limit in mind it will be seen that a rotor 30 feet in diameter would be rotating at twice the r.p.m. of a rotor 60 feet in diameter, so that one pound of air at the periphery of the smaller rotor would under these circumstances possess twice the centrifugal force of the larger rotor under the formula for centrifugal force $$\frac{WRN^2}{2933}$$

where W is the weight in pounds, R the radius in feet, and N the revolutions per minute.

This is important since some degree of compression by centrifugence is required within the fuel-air mixture for proper combustion, and while the centrifuging of the ambient air mass does not compare with the effectiveness of the air compressed by the compressor this deficiency is somewhat remedied by the large volume of the ambient air available and the very great possibility that the noise factor so prevalent with the Fairy "Rotordyne" will be reduced to acceptable levels.

Other considerations having a pertinent bearing on the matter are that the deflection of a centilever under load increases as the cube of the span, consequently from an engineering standpoint the smaller rotor would be relatively 8 times stronger so necessary since operating under a $C_L$ max. 7.5 at least as against 1.4 with the Rotordyne rotor, the smaller rotor will have to carry 5.4 times the load per square foot of blade surface.

One clear-cut advantage to be gained by the present invention is that with the Fairy "Rotordyne" all the highly compressed air energy available to the rotor was directed to the propulsion of the rotor blades, generating the necessary lift force by conventional aerodynamical means, while with present proposals the whole of this available energy is directed to the production of lift by the jet flap principle the effectiveness of which requires velocities approaching the speed of sound in the jet sheet, and this can only be attained with high air compression. The task of propelling the rotor is performed by the centrifuging and heating of the ambient air mass which it must be noted is an added source of power obtained at a small total expense in fuel.

Of all the forms of civil VTOL aircraft studied the configuration herein outlined would seem to provide the best answer so far for low cost civil city-center hauling able to operate within the prescribed limitations of the code of the Civil Aeronautics Board.

I do not wish to limit myself to the construction specification described, since experiment may suggest modification within the principles stated and I further do not rule out the introduction of a fuel combustion unit within the pylon if some benefit should ultimately be realizable by a substantial increase in temperature of the cold compressed air at that point.

An object of the invention is to provide a civil airliner in which all the hazards attendant upon high speed take-off and landing are eliminated.

An additional object is to provide a civil airliner having vertical-take-off and landing characteristics combined with low operating cost per passenger-mile.

A further object is to provide an airliner having VTOL characteristics to meet city-center to city-center Civil Aeronautics Board specifications in the short and medium haul range.

An additional object is to provide an airliner capable of operating in both VTOL and short-take-off-and-landing regimes.

A further object is to provide by the centrifuging of an ambient air mass entrained within the blades, an extra supply of power to meet the heavy demands of short duration required for VTOL operation, said power addition limited only by the amount of fuel that can be consumed.

An additional object is to provide a military VTOL aircraft capable of carrying relatively large payloads at 450 knots cruising speed.

Another object is to provide a VTOL aircraft having tip jet propulsion possessing a low noise factor by reason of increased volume but lower velocity within the jet.

A further object is to provide a rotorcraft in which all the fuel is completely gasified before being exhausted from the rotor.

A further object is to provide a lift component on both advancing and retreating blades by the built-in elevation of the plane of rotor rotation relative to the line of flight during autorotation.

An additional object is to provide a rotor-craft of such robust rotor construction as to withstand the high translational velocities with a minimum of vibrational stress.

FIGURE 1 is a plan view of the first embodiment of the rotorcraft.

FIGURE 2 is a side view of the first embodiment of the rotorcraft.

FIGURE 3 is a front view of the first embodiment of the rotorcraft.

FIGURE 4 is a sectional side view of the pylon construction.

FIGURE 5 is a sectional plan view of the rotor blade tip showing location of combustion units and spanwise slits.

FIGURE 6 is a cross-sectional view of the blade profile of the two-bladed rotor of the first embodiment.

FIGURE 7 is a cross-sectional view of the blade profile of the multi-blade rotor of the second embodiment.

In the drawings FIGURES 1, 2, and 3, showing the first embodiment, the rotor comprises a pair of rigid hollow blades 1 rotatable upon anti-friction bearings 2 secured to a pylon 3 superimposed on a fuselage to which is secured landing gear 5 fixed wings 6 having front and rear hinged flaps 7 and aerodynamic surfaces 8 for the directional control of the aircraft. Cold compressed air generated by the gas turbine compressor assembly 9 secured to the fixed wings 6 is conveyed via the streamlined hollow braces 10 and duct 24 within the pylon 3 and cylindrical ducts 11 within the rear portion of the rotor blade 1 to the compound tip jets 12 initially providing a degree of propulsion to the rotor blade 1 with subsequent diversion to the spanwise slits 13 which open to the atmosphere, said diversion being accomplished by means of a weight 20 centrifugally operated closing a spring-loaded butterfly valve 21 at the outer end of cylindrical duct 11 and shown in greater detail in FIGURE 5. When the required r.p.m. on the rotor has been attained, a Bowden wire-operated spring-loaded flat disc 14 covering the opening 15 at the hub of the rotor blades 1 is allowed to freely extend upward by means of the pull rod 27 and so admit ambient air to the interior of the blade 1 where it is conveyed and centrifuged via the longitudinal ducts 16 in the front portion of the blades 1 to the combustion units 17 containing ignition means and a fuel nozzle, communicating with a centrifugally valved extraneous fuel source 18. Said combustion units 17 are located near the outer end of said longitudinal ducts 16 and burn the centrifuged air-fuel mixture for ejection to the rear via the compound tip jet 12. Such oil as is not fully burnt is flung by centrifugal force against the curved end of ducts 16 and so corrects the condition of hot oil splattering. As the blades 1 further accelerate, the butterfly valve 21 closes off the supply of cold compressed air to the compound tip jet 12.

An auxiliary gas turbine 19 located behind the pylon 3 is available to supply reserve power during transition from vertical to horizontal flight and if with compressor facilities would supply additional cold compressed air to the pylon 3 alternatively to assist in the generation of jet flap lift during VTOL operation.

Operational height for cruising flight having been attained the propeller blades 22 of the gas turbine compressor assembly 9 have their pitch increased slightly and the auxiliary gas turbine 19 is given full throttle, simultaneously the flat disc 14 is drawn down to cover the opening 15 closing off the supply of ambient air. At the same time the gas turbine compressor 9 is declutched and the gas turbine given full throttle simultaneous with an increase in pitch of the propeller 22 to insure full cruising speed.

FIGURE 4 shows a cross-sectioned side view of the cylindrical pylon 3 shrouded in a streamlined cowling 25. The cylindrical pylon 3 consists of a tube rigidly secured to the fuselage 4 and extending upward and backward at an angle of about 3 degrees. The downward extension of the rotor 23 is journalized at its upper and lower extremity on anti-friction bearings 2 positioned on the pylon 3, while concentrically disposed within the pylon 3 and secured thereto is a duct 24 bifurcated at its lower end to connect with the pair of streamlined hollow braces 10 leading in from the compressor assembly 9. At the upper end of the duct 24 and pressure sealingly enveloping it, is a rotatably mounted cap 26 similarly bifurcated to connect with the cold compressed air ducts 11 in the rear portion of the rotor blades 1.

At its upper end supporting the flat disc 14 covering the opening 15 is a rod 27 axially positioned within the pylon 3 at dead center. The said rod 27 is vertically movable in guides against the resistance of a helical spring and activated by a Bowden wire cable 28 in tension to close off the opening 15 and with it the ambient air when desired.

At the lower end of the rotor hub extension 23 is secured a flange plate 29 having the double purpose of sustaining the lift of the rotor and providing a braking surface to bring the rotor to rest when required. A pair of hydraulic jacks 30 apply pressure through the medium of brake shoes 31 to bear against the flange plate 29.

In FIGURE 5 a series of longitudinal ducts 16 in the front portion of the rotor blade are curved through 90 degrees to the rear to terminate in the compound tip jet 12. These ducts 16 are separated from each other by a cooling air space 32 while the upper and lower surfaces are cooled by the movement of the rotor blade 1 through the air.

Within the main cold air ducts 11 beyond the range of the spanwise slits 13 is the butterfly valve 21, a weight 20 overcoming spring tension to close the valve 21 when sufficient centrifugal force has been generated to do so.

FIGURE 6 outlines the blade profile of the two-bladed rotor 1 which is required to remain at rest in the transverse position during translational flight. The profile reveals a symmetrical contour on each upper and lower surface generating lift with movement of the air from either front or rear when autorotating. Longitudinal ducts 16 containing combustion units 17 as well as cylindrical ducts 11 are shown in their respective positions within the blade 1. Spanwise slits 13 indicate the direction of the flow of the air jet sheets.

FIGURE 7 shows an outline of the rotor blade profile of the second embodiment where four or more blades are used. These have a symmetrical upper surface 33 and an unsymmetrical lower surface 34 designed to cause slight autorotation in cruising flight.

I claim:

1. Improvements in rotorcraft of the Fairy "Rotordyne" configuration having VTOL characteristics, having a fueselage, fixed wings, landing gear and hinged aerodynamic surfaces for the directional control of said aircraft in translational flight, a pylon superimposed on said fuselage, a rotor assembly mounted upon said pylon having rigid hollow non-articulated blades divided into a front portion and a rear portion, gas turbines with compressed air-bleed facilities secured to said wings astride said fuselage, ducted communication between said compressed air-bleed facilities and the rotor blade tip via said pylon providing for initial tip jet propulsion, and in ordered sequence airborne support by the jet flap principle, said rotor assembly comprising a plurality of longitudinal ducts in said front portion of said rigid hollow non-articulated blades, said blades having an opening at the hub for the admission of ambient air, longitudinal ducts in the rear portion of said blades, said ducts being cylindrical in form and having a series of spanwise slits opening variously downward to the atmosphere.

2. Improvement in rotors of the Fairy "Rotordyne" configuration as described in claim 1 in which the root area of the rotor is enclosed within a flattish dome to reduce drag and increase the volume of ambient air available for centrifuging.

3. Improvement in rotorcraft as described in claim 1 in which an independently controlled gas turbine is centrally disposed above the fuselage at the rear of the pylon capable of generating sufficient thrust to sustain the load during transition from vertical to horizontal flight.

4. In rotorcraft as described in claim 1, the combination of an independently controlled supplementary gas turbine, centrally disposed, and the transverse hinging and downward deflection of the front and rear portions of the fixed wings, such combination co-acting to support the load in translational flight at low speed.

5. Improvement in rotor assemblies of VTOL rotorcraft of the Fairy "Rotordyne" configuration as described in claim 1 in which the plane of rotation of said rigid hollow non-articulated rotor by design is set at a small positive angle of attack substantially equal to that of the fixed wings.

6. Improvement in rotorcraft of the type described in claim 1 in which an ignition-fired fuel combustion unit communicating with an extraneous fuel source is positioned within the duct within the pylon, converting said compressed air into a hot heterogenous gas capable of further combustion.

7. Improvement in rotorcraft of the type described in claim 1 in which a positive lift force is generated equally by the passage in either direction of air over the upper cambered surface of said rotor blades, said rotor blades being rigidly rotatable and having a symmetrical upper camber, said positive lift force being increased by the built-in elevation of the plane of rotation to the line of flight.

8. Improvements in sustaining rotors for convertiplanes of the rotordyne configuration, comprising a rigid hollow rotor blade, mounted on a pylon superimposed on a fuselage and having valved means for the admission of ambient air into the upper central portion of said rigid hollow rotor blade, rotor propulsion jet orifices at the tip of said rotor blade, fuel combustion units and a fuel source centrifugally activated disposed midway of said ambient air opening and said tip jet orifices, a series of longitudinal cylindrical fluid pressure ducts located in the rear portion of said rigid hollow rotor blade linking said tip jet orifices with a source of compressed air via said pylon, spanwise slots in said longitudinal cylindrical fluid pressure ducts downwardly exhausting said compressed air into the atmosphere to create jet flaps, a valve centrifugally activated in said cylindrical ducts closing off the supply of said compressed air to said tip jet orifice, a fuel combustion unit located midway between said centrifugally activated valve and said tip jet orifice, and ignition means associated with all said combustion units.

9. Improvements in sustaining rotors for convertiplanes of the rotordyne configuration comprising a non-articulated rotor of rigid hollow construction mounted upon a pylon superimposed on a fuselage, said rigid hollow rotor being divided into a front and a rear portion, said rotor having a series of one-way rotation-inducing jet orifices at the tip, a valved opening in the upper central portion of said rotor for the admission of ambient air, said front portion of said rotor having a series of longitudinal ducts linking said ambient air valved opening with said tip jet orifices, fuel combustion units disposed within said longitudinal ducts, a fuel source within said front portion of said rotor communicating with said fuel combustion units, said fuel source being activated by centrifugal means, the rear portion of said rotor containing longitudinal cylindrical fluid pressure ducts, said fluid pressure ducts being valved centrifugally and terminating in one of said tip jet orifices, a fuel combustion unit located between said centrifugally activated valve and said tip jet orifices and communicating with said fuel source, said cylindrical fluid pressure ducts communicating via said pylon with a source of compressed air, said fluid pressure ducts having spanwise slots opening to the atmosphere such that compressed air exhausted therefrom will create a jet flap, accelerate the boundary layer and simultaneously create a vertically downward diversion of the rotor slip stream.

10. In a rotorcraft of the Fairy "Rotordyne" configuration having VTOL characteristics, a fixed wing sustaining at cruising speed more than 85 percent of the load, a rotor assembly sustaining the balance of the load at said cruising speed and sustaining the whole of the load in the VTOL regime, said rotor assembly comprising a plurality of rigid hollow non-articulated blades having longitudinal ducts in the rear portion of said blades through which air is conveyed and ejected to provide in ordered sequence tip jet propulsion and airborne support by the jet flap principle, said longitudinal ducts in the rear portion of said blades being cylindrical to sustain interior fluid pressure and having spanwise slits open to the atmosphere in which cold compressed air is conveyed and ejected at the tip to provide initially rotor propulsion, in turn centrifuging ambient air admitted into and entrained via the front portion of said blades, said centrifuged ambient air being heated and ejected at the blade tip to provide constant rotor propulsion, said cold compressed air in ordered sequence by valve means centrifugally activated being diverted from said blade tip to said spanwise slits generating lift by means of an air jet flap at the desired rotor rotational speed.

11. In a rotorcraft of the Fairy "Rotordyne" configuration of the type described in claim 1, the diameter of said rigid hollow non-articulated blades of said rotor assembly having a maximum dimensional limit, said maximum limitation being determined by a capability of generating, by centrifugal force, a minimal degree of compression within said ambient air sufficient to create, when fuel is added and ignited, an explosive ram force within the gas mixture, said maximum blade dimension bearing an interdependent relationship imposed by the limitation of sonic speed at the blade tip.

References Cited by the Examiner

UNITED STATES PATENTS

| | | | |
|---|---|---|---|
| 2,511,025 | 6/50 | Tucker et al. | 244—7 |
| 2,585,676 | 2/52 | Poisson-Quinton | 244—42.41 |
| 2,653,778 | 9/53 | Bennett et al. | 244—5 |
| 2,925,129 | 2/60 | Yuan et al. | 170—135.4 |
| 2,989,268 | 6/61 | Andrews | 244—7 |
| 3,096,041 | 7/63 | Cheeseman et al. | 244—7 |
| 3,139,936 | 7/64 | Davidson et al. | 170—135.4 |

FOREIGN PATENTS

| | | |
|---|---|---|
| 735,106 | 8/55 | Great Britain. |

FERGUS S. MIDDLETON, *Primary Examiner.*

MILTON BUCHLER, *Examiner.*